Nov. 3, 1964 F. C. COWLARD ETAL 3,155,621

PRODUCTION OF SILICON WITH A PREDETERMINED IMPURITY CONTENT

Filed July 13, 1962 2 Sheets-Sheet 1

Nov. 3, 1964 F. C. COWLARD ETAL 3,155,621

PRODUCTION OF SILICON WITH A PREDETERMINED IMPURITY CONTENT

Filed July 13, 1962 2 Sheets-Sheet 2

United States Patent Office 3,155,621
Patented Nov. 3, 1964

3,155,621

PRODUCTION OF SILICON WITH A PREDETERMINED IMPURITY CONTENT

Frederick C. Cowlard, Towcester, and Leighton G. Penhale, Northampton, England, assignors to The Plessey Company Limited, Ilford, England, a British company Filed July 13, 1962, Ser. No. 210,310
2 Claims. (Cl. 252—62.3)

Figure 1:
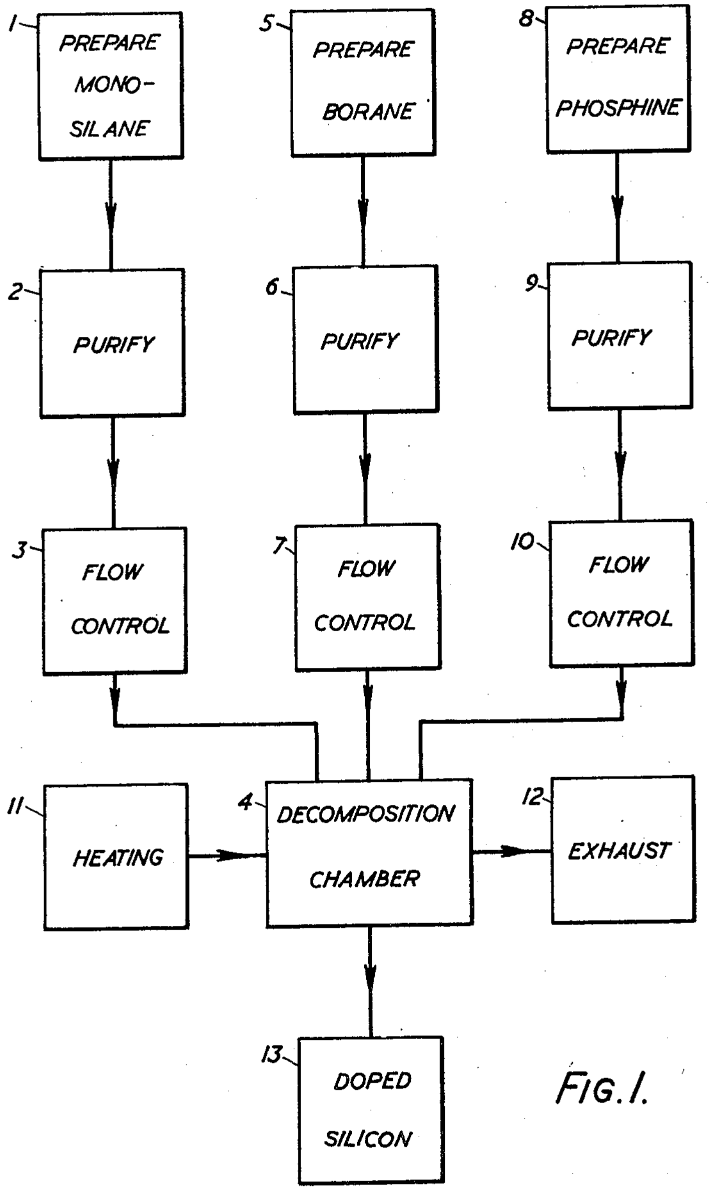

This invention relates to processes for the manufacture of semiconductor materials.

Semiconductor materials for use in rectifiers, transistors and the like are required to be prepared to exceptional standards, in that the material must have an impurity content which is exceedingly small by ordinary standards, and must contain an additive, necessary for producing the desired type and degree of conductivity, in a proportion which is also exceedingly small. The content of the additive must nevertheless be precisely controlled.

In the past, so far as we are aware, semiconductor material suitable for this purpose has been attainable only by first preparing a body of semiconductor material which is of greater purity than the final material required, and then incorporating the additive in the correct proportion.

The problem is made more difficult by the fact that the semiconductor will usually be wanted in a monocrystalline form; accordingly, a monocrystal must be formed from the "doped" material, that is, from the semiconductor with the appropriate additive. This involves heating the material and crystallising from the melt, and handling it; the melting introduces a danger of non-uniformity of composition throughout the body of the crystal produced, due to the tendency of additives to segregate at different rates, and the further handling adds a risk of unwanted impurities being picked up from apparatus in which the processes are carried out.

The present invention is concerned with the production of semiconductive materials with additives, by an improved process.

The present invention consists of a method of preparing a semiconductor material with an additive material, which comprises decomposing gaseous compounds of the semiconductor and additive materials to produce a common deposit of said materials.

The invention also includes a method of preparing a semiconductor material with a proportion of additive material, which comprises preparing a gaseous compound of said semiconductor material containing substantially less than the said proportion of impurity, preparing a gaseous compound of said additive material, and thermally decomposing said compounds to form a common deposit of said materials.

In applying the invention to the production of silicon semiconductor material the gaseous compound can be one of the silanes. Mono-silane is preferred, owing to the relative ease of preparation and purification. To produce p-type silicon the additive can be boron; a suitable gaseous compound is diborane. To produce n-type silicon the additive can be phosphorus, and a suitable gaseous compound is phosphine.

In one method of carrying out the present invention there is used an apparatus which is very similar to that described in our United States patent specification No. 3,006,734. In that application there is described a method of producing silicon of exceptional purity, by first preparing mono-silane and then directing the mono-silane into a heated decomposition chamber at low pressure, thereby causing the silicon to deposit upon a seed crystal. The method of producing highly pure silicon described in the above-identified co-pending application includes the steps of supporting within a decomposition chamber a pure silicon seed crystal so that a part of the seed crystal is not in contact with any part of the walls of the decomposition chamber and heating at least a portion of the seed crystal by means of thermal radiation from a source located wholly outside the decomposition chamber until the electrical resistance of the heated portion of the seed crystal is reduced to such an extent that the heated portion is responsive to inductive heating. The seed crystal is then inductively heated by induction heating means (which is also located outside the decomposition chamber) until the seed crystal is caused to melt to produce a molten surface. Silane is fed into the decomposition chamber towards the molten surface at such a rate that the silane is decomposed by a combined surface phase reaction and a gas phase reaction with the seed crystal. The seed crystal is progressively moved relative to the induction heating means so that silicon resulting from the combined decomposition solidifies on the seed crystal and builds up the silicon material onto the seed crystal.

The apparatus in which the above described method is carried out consists of a non-metallic decomposition chamber which is in the form of an elongated cylindical housing which is closed at the upper and lower ends. The lower end of the chamber is adapted to receive means for supporting a silicon seed crystal within the chamber so that the seed crystal is spaced from the walls of the chamber and in such a manner that the seed crystal can be progressively withdrawn from the chamber towards the lower end thereof. An induction heating arrangement is located around the outside of the decomposition chamber and is so placed that the induction heating arrangement can be caused to heat the seed crystal on the supporting means. Suitable flow control arrangements are provided for admitting silane into the decomposition chamber. Conveniently the silane is so introduced that it is directed onto the seed crystal. In addition, means are provided for heating at least a part of the seed crystal by means of thermal radiation which latter can conveniently be in the form of a heating source and reflector positioned wholly outside of the decomposition chamber. The same apparatus and process can be adopted for the purpose of the present invention, except that there is introduced into the reaction chamber diborane or phosphine, as required, in an amount to provide the requisite proportion of additive boron or phosphorus in the silicon; the correct proportion is attainable by control of the partial pressures.

In this way, a monocrystalline "doped" material can be obtained directly from the compounds. This material is obtained from the gaseous phase without contact, in solid form, with any material other than the silicon on which it is deposited. The risk of contamination is thus greatly reduced.

If for any purpose a micro or polycrystalline material is required, then there can be used the apparatus described in our United States patent specification No. 2,993,763. This corresponding co-pending application discloses a process for the preparation of flakes of sintered silicon comprising the steps of heating a silicon element which is located within a decomposition chamber by heating means located externally of the chamber, feeding highly pure silane into the chamber whilst at the same time maintaining the pressure within the decomposition chamber within the range of 0.5–50 centimeters of mercury. The silane is thermally decomposed by a gas phase reaction and the decomposed silane is allowed initially to form an amorphous layer of silicon on the walls of the decomposition chamber. Subsequent layers of decomposed silane which are deposited on the walls are heated by heat radiation from the silicon element. In addition further silane is caused to decompose into silicon on the amorphous layer whenever the latter is at a temperature above 450° C. so as to produce an exothermic temperature rise which sinters the silicon deposited upon the amorphous layer. The apparatus which is described in the co-pending specification includes a decomposition chamber including an elongated housing formed from quartz, upper and lower members for sealing off the ends of the housing, one of the members being removable from the housing, a silicon element which includes separate upper and lower portions located within the housing, upper and lower means for supporting each silicon element portion so that the portions can be moved relative to each other, means for applying electrical potential to the two silicon element portions for the purposes of producing an electric arc therebetween, means for introducing silane into the chamber and means for shielding the lower supporting means from the decomposed silane.

Figure 2:
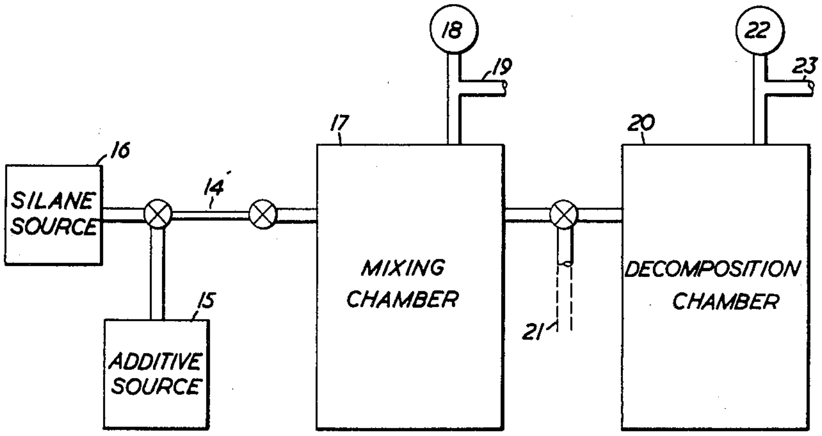

Other features and advantages of the invention will appear from the following description of embodiments thereof in conjunction with the accompanying drawings in which:

FIGURE 1 shows broadly the stages in the production of silicon with a predetermined impurity content, and FIGURE 2 shows in greater detail the apparatus used for proportioning the silicon and the impurity according to the partial pressures of the hydrides.

In FIGURE 1, monosilane is produced at stage 1, purified at stage 2, and fed through a flow control means 3 to the decomposition chamber at stage 4.

If the p-type semiconductor is required, borane is prepared at 5, purified at 6 and fed through a flow control means 7 to chamber 4. If n-type material is required, phosphine is prepared at 8, purified at 9 and fed through flow control means 10 to the chamber 4.

Associated with chamber 4 is a heating means 11 to establish and maintain the appropriate decomposition temperature. An exhaust means 12 is used to remove excess hydrides and hydrogen and to maintain the appropriate pressure in chamber 4. The doped silicon is obtained at 13.

According to the present invention, the correct proportion of additive is obtained accurately without the use of a carrier gas or of the delicate adjustment of flow gauges by a volumetric method dependent upon the partial pressures of the constituent gases.

This method will be described more fully with reference to FIGURE 2 of the accompanying drawings which shows schematically apparatus for the production of doped silicon.

A capillary tube 14 is connected through a first two-way tap to a source 15 of the pure additive hydride at a known pressure. The tap is also connected to a source 16 of pure silane at a known pressure. The arrangement is such that either of these gases may thus be passed through the capillary tube. The opposite end of the capillary 14 leads to a mixing chamber 17 which is provided with a gauge 18 to measure the pressure within the chamber and a lead 19 to a vacuum pump. The mixing chamber 17 is connected through a second two-way tap to a decomposition chamber 20 having provision for depositing semiconductor material. To this second two-way tap is connected at 21 a duplicate set of gas sources, a capillary tube and a mixing chamber (not shown) so that this mixing chamber may supply the decomposition chamber when the first mixing chamber is being refilled. In this way, a continuous operation of the decomposition chamber may be achieved. The decomposition chamber 20 is provided with a pressure gauge 22 and a lead 23 to a vacuum pump for removing gaseous reaction products.

In operation, the inside of the apparatus is first carefully cleaned and the apparatus is then sealed and evacuated by means of the vacuum pumps. The additive hydride from the source 15 is introduced through the first two-way tap at a known pressure and fills the capillary tube 14 of known volume. The diluent silane from the source 16 is then admitted to the capillary tube 14 and sweeps the additive hydride in the capillary into the mixing chamber 17. The silane is allowed to continue flowing through the capillary 14, flushing out the last traces of the additive hydride, and building up the pressure within the mixing chamber 17. The known volume of additive hydride and the increasing volume of silane entering the chamber both exert pressures, the total of which is indicated on the gauge 18 connected to the chamber. The large entering volume of silane rapidly distributes the additive hydride so that it becomes evenly dispersed throughout the mixture.

By calculation, one can determine the pressure in the mixing chamber 17 when the proportion of silane to additive hydride will be in a ratio to give the required proportions of silicon and additive in the finished product. When the rising pressure in the mixing chamber 17 reaches this value, the flow of silane is stopped. The resulting mixture of silane and additive hydride within the mixing chamber 17 thus corresponds to the predetermined calculated proportions required in the semiconductor material.

The mixture may thus be admitted to the decomposition chamber 20 through the second two-way tap. The difference in the pressures within the mixing and decomposition chambers ensures the flowing of the mixed gases and they may be arranged, for example, to impinge upon a crystal of silicon held at the melting point of 1420° C. At this temperature both the silicon and additive hydrides are instantly and completely decomposed. In this way, silicon and the correct predetermined proportion of additive can be rapidly deposited together upon the heated surface of the crystal without loss of their high purity caused by a possible contact with any sources of contamination.

The rate of deposition may be easily controlled so that the deposit will retain the same crystal form as that of the initial seed crystal, if this is desired.

When the mixing chamber 17 is becoming exhausted the decomposition chamber may be connected to the duplicate mixing chamber for operation whilst the first mixing chamber is being recharged. In this way, substantially continuous operation of the decomposition chamber can be achieved.

This method of obtaining a predetermined impurity content in silicon is simple and does not involve the use of complicated flow systems which are difficult to adjust. The silicon is prepared with a known amount of impurity which can be calculated with great accuracy beforehand. Additionally, by using pure reactants, instead of reactants diluted with a carrier gas, the efficiency of the decomposition reaction is brought closer to the theoretical efficiency. There is also a minimum loss of reactants by entrainment in the gaseous by-products.

This application is a continuation-in-part of application Serial No. 696,568, filed November 14, 1957, now abandoned.

What we claim is:

1. A method of preparing hyper-pure silicon semiconductor material containing a predetermined quantity of an additive material, comprising the steps of forming in a mixing chamber a gaseous mixture consisting solely of silane and a gaseous compound of the additive material, the latter being selected from the group consisting of boron and phosphorous, controlling the partial pressures of the gaseous materials fed to the mixing chamber so as to obtain a mixture ratio which corresponds to said predetermined quantity of additive material, feeding the gaseous mixture into a decomposition chamber by means of a pressure difference between the two chambers, heating the decomposition chamber and controlling the temperature and pressure within the decomposition chamber so that the gaseous compounds are thermally decomposed to provide a common deposit of silicon and additive material.

2. A method of preparing hyper-pure silicon semiconductor material containing a predetermined quantity of an additive material selected from the group consisting of boron and phosphorus, comprising the steps of forming in a mixing chamber a mixture of a gaseous compound of silicon and a gaseous compound of the selected additive material, controlling the partial pressures of the two gaseous compounds of silicon and additive material thereby to control the mixture ratio thereof, feeding the gaseous mixture consisting solely of the two gaseous compounds to a decomposition chamber by means of a pressure difference between the two chambers and controlling the temperature and pressure within the decomposition chamber so that the gaseous compounds are thermally decomposed to provide a common deposit of silicon and additive material.

References Cited by the Examiner

UNITED STATES PATENTS 2,910,394 10/59 Scott et al. ------------ 252—62.3

MAURICE A. BRINDISI, *Primary Examiner.*